US008663823B2

(12) United States Patent
Van Schyndel et al.

(10) Patent No.: US 8,663,823 B2
(45) Date of Patent: *Mar. 4, 2014

(54) LOW MAGNETIC INTERFERENCE BATTERY AND MOBILE COMMUNICATION DEVICE

(71) Applicant: Research In Motion Limited, Waterloo (CA)

(72) Inventors: Andre John Van Schyndel, Kanata (CA); Larry Edward Hawker, Waterloo (CA); Mallikarjun Boda, Waterloo (CA); Jonathan Quinn Brubacher, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,157

(22) Filed: Dec. 13, 2012

(65) Prior Publication Data

US 2013/0183545 A1    Jul. 18, 2013

Related U.S. Application Data

(63) Continuation of application No. 12/502,349, filed on Jul. 14, 2009, now Pat. No. 8,357,460.

(51) Int. Cl.
*H01M 2/00* (2006.01)
(52) U.S. Cl.
USPC ............................................ 429/10; 429/163
(58) Field of Classification Search
USPC ................... 429/10, 163, 175, 176
See application file for complete search history.

(56) References Cited

U.S. PATENT DOCUMENTS

| 8,357,460 | B2* | 1/2013 | Van Schyndel et al. ........ 429/10 |
| 2006/0125569 | A1 | 6/2006 | Takayama et al. |
| 2007/0166611 | A1 | 7/2007 | Oh et al. |
| 2007/0269685 | A1 | 11/2007 | Chu et al. |

FOREIGN PATENT DOCUMENTS

| CN | 1988214 A | 6/2007 |
| CN | 201188432 Y | 1/2009 |
| JP | 2002100893 A | 4/2002 |
| JP | 2002261894 A | 9/2002 |
| JP | 2003067692 A | 3/2003 |
| JP | 2006278897 A | 10/2006 |
| JP | 2007220372 A | 8/2007 |
| JP | 2008251283 A | 10/2008 |
| JP | 2009163929 A | 7/2009 |
| JP | 2011511412 A | 4/2011 |
| WO | WO 2009015282 A1 | 1/2009 |

OTHER PUBLICATIONS

U.S. Appl. No. 12/502,349, filed Jul. 14, 2009, entitled Low Magnetic Interference Battery and Mobile Communication Device.

(Continued)

*Primary Examiner* — Stephen J. Kalafut
(74) *Attorney, Agent, or Firm* — Perry + Currier

(57) ABSTRACT

A communication device, and battery there for, are provided. In at least one of the battery and the communication device is provided a magnetic shield portion for routing magnetic flux away from the receiver when the radio is in operation. The magnetic shield portion can be incorporated into at least one of the battery and the communication device. When the battery is inserted into mobile communication device, the magnetic shield portion is located substantially between a battery portion, in the battery, and the receiver.

10 Claims, 12 Drawing Sheets

(56) References Cited

OTHER PUBLICATIONS

Related Korean Patent Application No. 10-2012-7001089 Office Action dated Mar. 4, 2013, with English translation.
Related European Patent Application No. 09845664.3 Search Report dated Jan. 30, 2103.
English translation of Japanese Patent Application No. 2012-514300 Office Action dated Jul. 23, 2013.
Related Chinese Patent Application No. 201080035979.6 Office Action dated Nov. 5, 2013 (English translation).

* cited by examiner

LOW MAGNETIC INTERFERENCE BATTERY AND MOBILE COMMUNICATION DEVICE

This application is a continuation of Ser. No. 12/502,349, filed on Jul. 14, 2009, which is now U.S. Pat. No. 8,357,460.

TECHNICAL FIELD

The present disclosure relates generally to batteries and more particularly to a mobile communication device and battery there for characterized by low magnetic interference.

BACKGROUND

Mobile communication devices are popular for business and personal use. Such devices include Personal Digital Assistants (PDAs), cellular phones and smart phones. These devices provide wireless two-way voice and data communication over wireless networks such as GSM/GPRS, CDPD, TDMA, iDEN Mobitex, DataTAC, EDGE or UMTS networks, and broadband networks like Bluetooth and variants of 802.11.

It is desirable that the electromagnetic fields generated by such devices be minimized for health reasons and in order to reduce interference with other nearby electronic devices. For example, international standards on Hearing Aid Compatibility (HAC) establish a minimum signal-to-noise (SNR) ratio at the T-coil of a hearing aid (for example, see section 7.3.4 "Signal Quality" of ANSI C63.19-2007) for effective magnetic wireless coupling to the hearing aid (including hearing aids, cochlear implants, and assistive listening devices) while minimizing magnetic interference. The hearing aid compatibility requirements are generally evaluated with the hearing aid coil in close proximity to the receiver in the mobile communication device. Traditional approaches to meeting the required signal-to-noise ratio in the presence of magnetic fields generated by mobile communication devices include increasing current in the mobile communication device receiver, installing a separate T-coil within the mobile communication device, and altering current loops and circuit board traces within the mobile communication device to minimize magnetic interference.

DETAILED DESCRIPTION

Figure 1:
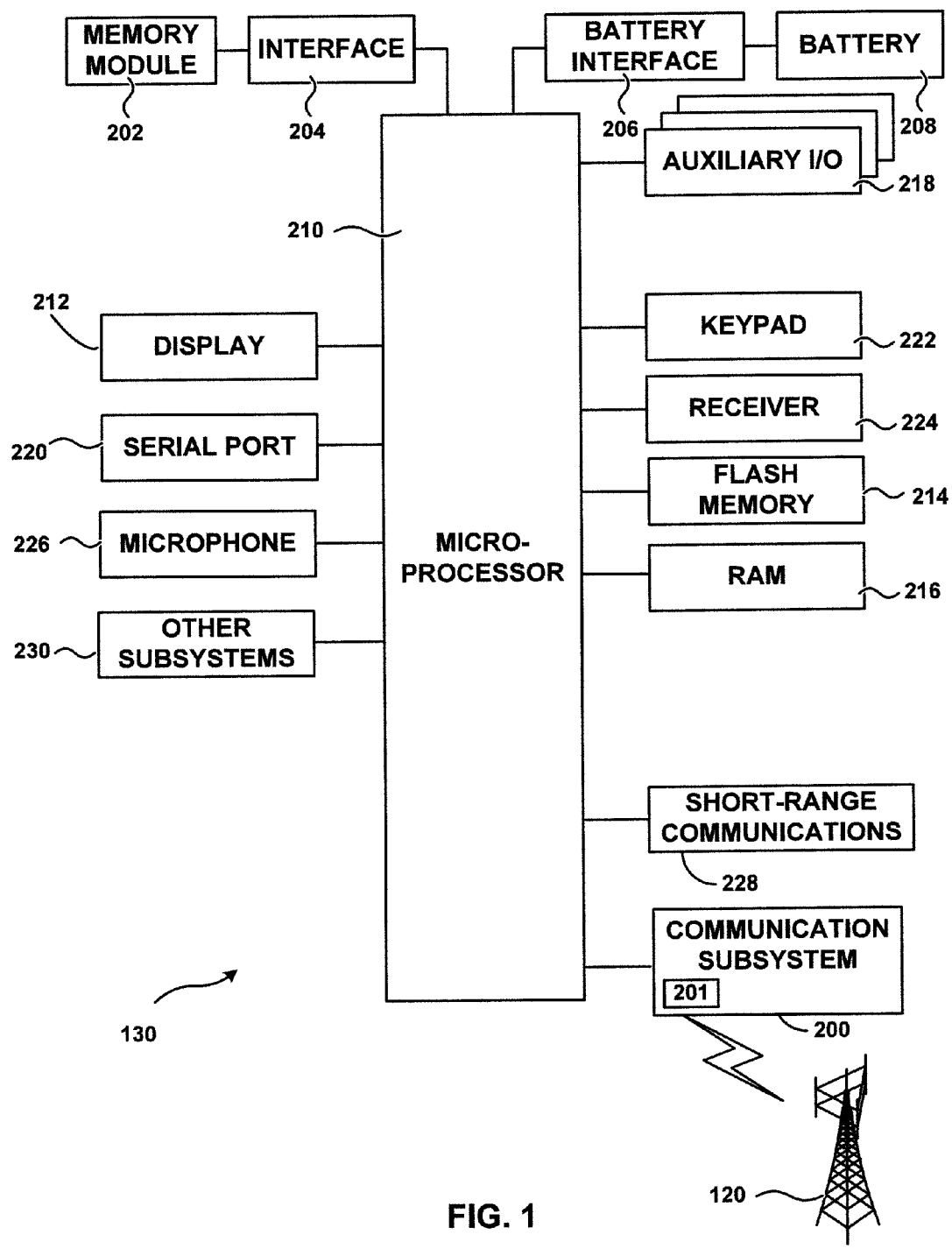
FIG. 1 is a block diagram illustrating a wireless mobile communication device in accordance with the present disclosure.

Magnetic noise may be generated by a battery of a mobile communication device due to current draw associated with GSM radio transmission. Accordingly, it is desirable to minimize magnetic interference from mobile communication devices in general and to minimize magnetic interference from mobile communication device batteries due to current draw on the battery.

A first aspect of the specification provides a battery, insertable into a mobile communication device, the mobile communication device comprising a radio interconnected with a microphone and a receiver. The battery comprises a battery portion enabled to provide electrical power to the radio, the battery portion emitting a magnetic field when in operation. The battery further comprises a magnetic shield portion arranged relative to the battery portion such that magnetic flux from the battery portion is routed away from the receiver when the battery is in operation in the mobile communication device.

The magnetic shield portion can be substantially planar.

The magnetic shield portion can be substantially parallel to a side of the battery portion which, when inserted into the mobile communication device, is oriented towards the receiver.

When the battery is inserted into mobile communication device, the magnetic shield portion can be located substantially between the battery portion and the receiver.

The magnetic shield portion can substantially encompass the battery portion. The magnetic shield portion can further comprise apertures for contacting the battery portion.

The magnetic shield portion can comprise a high magnetic permeability material. The high magnetic permeability material can comprise Mu metal.

The battery can further comprise a case, and the magnetic shield portion can be at least one of internal and external to the case. The magnetic shield portion can be internal to the case, the magnetic shield portion being planar and of a first thickness that provides structural support to the battery. The battery can further comprise a planar structural element, internal to the case, of a second thickness that provides structural support to the battery. The magnetic shield portion and the planar structural element can substantially sandwich the battery portion. The planar structural element can be enabled to route the magnetic flux there through, such that the magnetic flux is routed through the magnetic shield portion and the planar structural element.

At least one normal of the magnetic shield portion can be oriented in a direction of the magnetic field.

A second aspect of the specification provides a mobile communication device. The mobile communication device comprises a radio interconnected with a microphone and a receiver. The mobile communication device further comprises a magnetic shield portion for routing magnetic flux away from the receiver when the radio is in operation, the magnetic flux from sources of magnetic interference in the mobile communication device.

The mobile communication can further comprise a battery interface for receiving a battery to provide electrical power to the radio, the battery emitting a magnetic field when the radio is in operation, wherein when the battery is inserted into the battery interface, the magnetic shield portion is located between the battery and the receiver. The magnetic shield portion can be located on a face of the battery interface.

The magnetic shield portion can be incorporated in at east a body of the mobile communication device.

The magnetic shield portion can comprise a high magnetic permeability material. The high magnetic permeability material can comprise Mu metal.

A discussion of the prior art and exemplary embodiments follow hereafter with reference to the drawings.

FIG. 1 is a block diagram illustrating some of the components of a wireless mobile communication device 130. In the embodiment depicted in FIG. 1, wireless mobile communication device 130 includes a communication subsystem 200 for wireless two-way data and voice communication with the wireless network 120. Communication subsystem 200 may include one or more receivers, transmitters, antennas, signal processors and other components associated with wireless communications including but not limited to a radio 201. The particular design of the communication subsystem 200 can depend on the network in which the wireless mobile communication device 130 is intended to operate. The concepts herein may be applicable to a variety of wireless mobile communication devices, such as two-way pagers, cellular telephones, etc.

In the embodiment shown in FIG. 1, wireless mobile communication device 130 comprises a microprocessor 210, a display 212, a flash memory 214, RAM (random access memory) 216, an auxiliary I/O (input/output) 218, a serial port 220, a keypad 222, and other subsystems 230.

In the embodiment shown in FIG. 1, network access is associated with a subscriber or user of the wireless mobile communication device 130 via a memory module 202, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 204 of the wireless mobile communication device 130 to operate in conjunction with the wireless network 120. Alternatively, the wireless mobile communication device 130 may have an integrated identity module for use with systems such as Code Division Multiple Access (CDMA) systems.

The wireless mobile communication device 130 also includes a battery interface 206 for receiving at least one rechargeable battery 208. The battery 208 provides electrical power to at least some of the electrical circuitry in the wireless mobile communication device 130, and the battery interface 206 provides a mechanical and electrical connection for the battery 208. As discussed above and in greater detail below, it has been discovered that when the mobile communication device 130 is held in close proximity to a hearing aid device (as is the case during normal cell phone usage, for example when a receiver 224 is held close to a hearing aid device) the time waveform (and frequency spectrum) of the Radio Frequency (RF) amplifier current within communication subsystem 200 is largely the same as that of the measured magnetic noise at the hearing aid coil. This indicates that interference problems with the hearing aid result from magnetic noise generated by currents within the communication system associated with GSM radio transmission. Through subsequent measurements and analysis, it was found that a large portion of this magnetic noise was generated by the battery, though magnetic noise can be generated by other components of the communication device 130.

The communication device 130 also generally includes radio 201 (e.g. within the communication subsystem 200), a microphone 226 and the receiver 224. The receiver 224 can include, but is not limited to, a voice coil, a hearing aid coil and a separate T-coil.

The wireless mobile communication device 130 may include one or more circuit boards (not shown) that implement the components described above. This disclosure is not limited to any particular electronic component or software module or any combination thereof.

Figure 2:
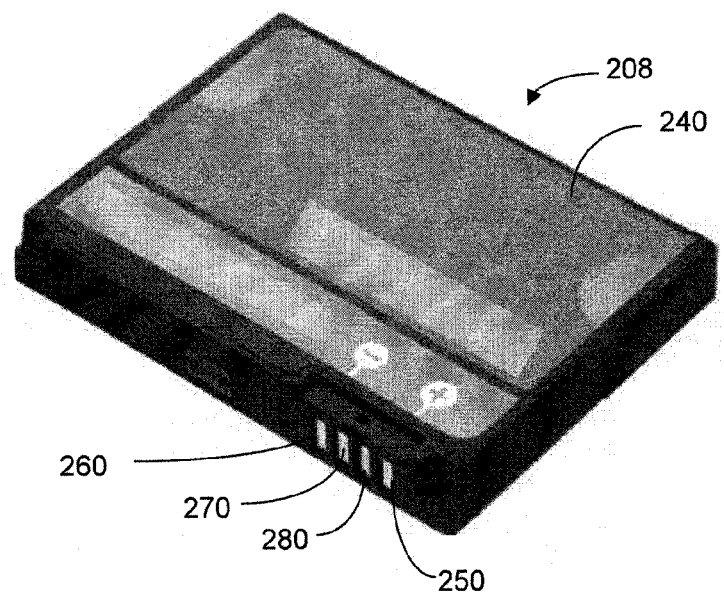
FIG. 2 is a perspective view of a conventional battery for powering the wireless mobile communication device of FIG. 1.

FIG. 2 shows a conventional battery 208 for powering a mobile communication device 130. The battery is assembled inside a case 240 and includes a positive contact pad 250, a negative contact pad 260, and may include a temperature contact pad 270 and a cryptography contact pad 280 for testing manufacturer's authenticity of the battery 208. Although not shown, the battery may include an internal microprocessor and a switch in series with the contact pads 250 and 260 which is opened by the internal microprocessor if the battery discharges below a predetermined level, in order to avoid damage to the battery. Likewise, if the battery temperature elevates beyond a predetermined level, as indicated on the temperature contact pad 270, the microprocessor may cause the switch to open.

A sandwich electrode assembly is located within the case 240, comprising coated metallic films that according to the most common configurations are either stacked, folded back and forth like an accordion (referred to as a Z-type electrode assembly), or rolled up and flattened (referred to as a "jellyroll" electrode assembly). Reference will be made hereinafter to the construction and design of "jellyroll" electrode assemblies, although a person of skill in the art will appreciate that the principles set forth herein apply equally to other designs and configurations of electrode assemblies.

Figure 3A:
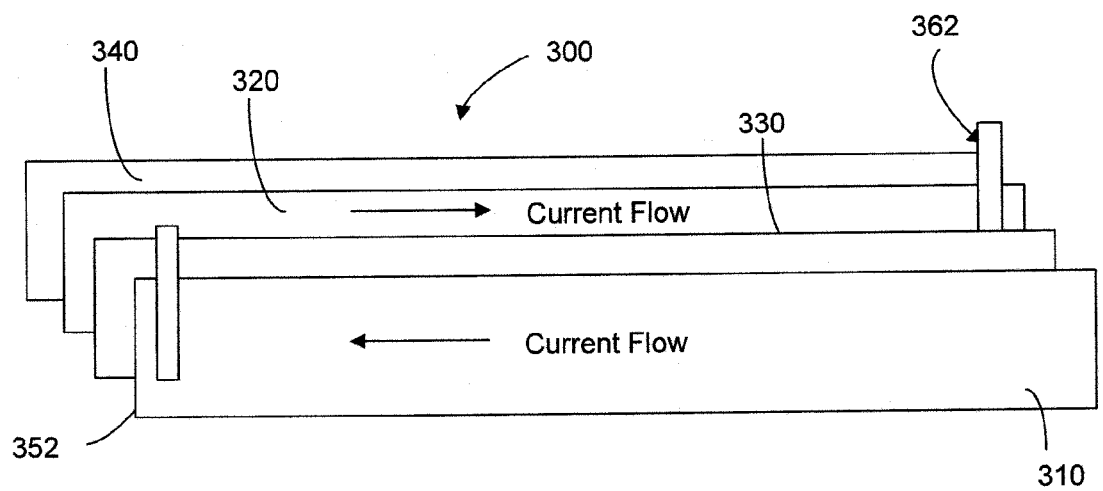
FIG. 3A is a schematic representation of positive and negative electrodes of a prior art battery such as that shown in FIG. 2, in an un-rolled configuration.
Figure 3B:
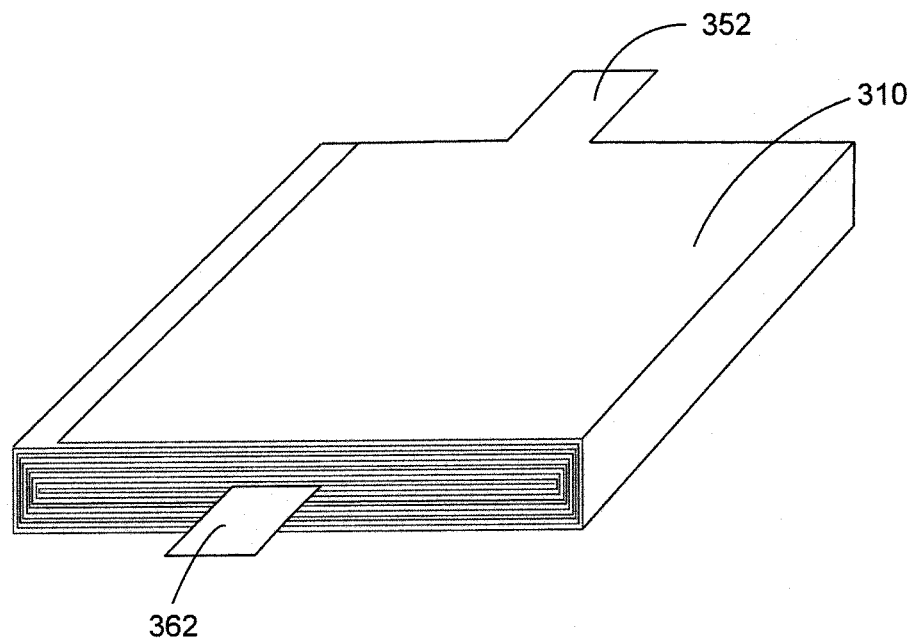
FIG. 3B is a schematic representation of positive and negative electrodes of a prior art battery such as that shown in FIG. 2, in a rolled-up configuration.

One such "jellyroll" electrode assembly 300 is schematically represented in FIG. 3A in its un-rolled state and in FIG. 3B in its final rolled-up state. The exemplary prior art electrode assembly 300 comprises a positive electrode sheet 310 (cathode) and a negative electrode sheet 320 (anode) sandwiched together with a separator sheet 330 between them, and a further outer separator sheet 340 that may curl around the end of the positive electrode sheet 310 at the innermost section of the jellyroll so as to completely isolate the positive and negative electrodes. The separator sheet 330 contains an electrolyte, such as lithium salts, such as LiPF6, LiBF4, or LiClO4, in an organic solvent, such as ether. The electrolyte may also be acid such as in a lead-acid battery, alkaline electrolyte usually potassium hydroxide in a nickel metal hydride or nickel cadmium. The positive electrode sheet 310 may comprise a thin sheet of aluminum (e.g. 15 µm) that is coated on both sides (e.g. 60-70 µm per side) with Lithium cobalt oxide (LiCoO2), or other suitable material, while the negative electrode sheet 320 may comprise a thin sheet of copper foil (e.g. 10 µm) that is coated on both sides with graphite (e.g. 60-70 µm per side), such that electrical current flows from the cathode to the anode. The separator sheet 330 (e.g. 20 µm) has openings in it that allow the electrolyte liquid to permeate between the positive and negative electrode sheets 310 and 320. The separator sheet 330 thus physically separates the two electrode sheets while allowing ions to flow between them. Additional details of the construction of a conventional jellyroll electrode assembly may be found in the prior art, as exemplified by U.S. Pat. No. 7,488,553 (Tsukamoto et al).

Figure 4:
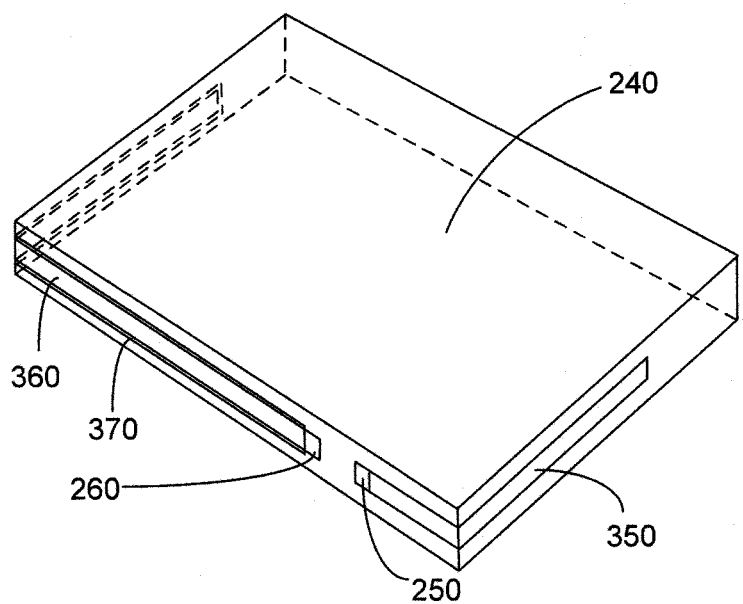
FIG. 4 is a schematic representation of positive and negative contact pads of a prior art battery such as that shown in FIG. 2.

Electrical connection between the negative electrode sheet 320 and battery contact pad 260 may be made via a conducting tab 362 that extends to an insulated feed-through (for example, as discussed below and shown schematically in FIG. 6) which connects to a conductive strip 360 that is insulated from the case by an insulator 370 and which extends from the feed-through to the battery contact pad 260, as shown in FIG. 4. Electrical connection between the positive electrode sheet 310 and battery contact pad 250 may be made either by leaving the aluminum electrode uncoated in its last roll of the jellyroll structure so as to expose the bare aluminum electrode and spot-welding, or crimping the last roll of the electrode 310 to the conductive case 240, or by spot-welding or crimping a conducting tab 352 to the case 240, thereby forming an external connection to the positive electrode through the case. A further conductive strip 350 may be spot-welded to an opposite side of the case from the spot-welded tab 352, or last roll of positive electrode sheet, which extends from the spot-weld on the case 240 to the battery contact pad 250, as shown in FIG. 4. In such an arrangement, the positive connection to outside of the case 240 is made on the opposite side of the battery case to the negative connection, as shown in FIG. 3B. However, it is also known in the art for the positive and negative connections to outside of the case 240 to be on the same side.

Power is typically provided from the battery 208 to a device, such as communication device 130, via conducting pads (260, 250), as discussed above. As shown in FIG. 4, a strip of conductor 350 carries the current from the conductive case 240 to the positive pad 250. The connection from the negative feed-through to conductive strip 360 is made on the opposite side of the battery from the positive connection. The conductive strip 360 carries the current from the feed-through to the negative pad 260. It will be appreciated that the arrangement of FIG. 4 results in large currents flowing externally of the battery case 240.

As shown in FIGS. 3A and 3B, if the connections 352 and 362 to the electrodes are made at opposite ends of the electrode assembly 300, i.e., one connection is made on the center of the jellyroll and the other on the outside of the jellyroll, current flow within the positive and negative electrode sheets 310 and 320 is in the same direction. Moreover, the magnitude of the electrode current increases from zero at the end opposite the connection to maximum at the end with the connection. Therefore, the magnitude of the current in the two electrodes as a function of position is significantly different.

Sources of magnetic noise in the prior art battery design of FIGS. 3 and 4 include noise from the electric currents flowing in the jellyroll electrode assembly 300 and ion current in the electrolyte liquid, the connections from the electrodes 310, 320 to the feed-throughs, currents flowing in the battery case 240 and the external conductive strips 350, 360.

Figure 5:
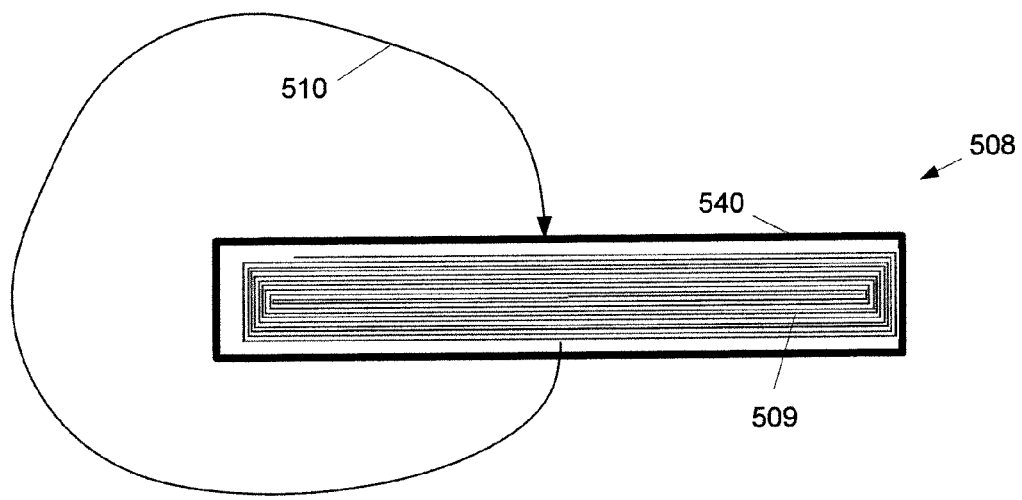
FIG. 5 is a schematic representation of a cross section of a side view of a prior art battery emitting magnetic flux in operation.
Figure 6:
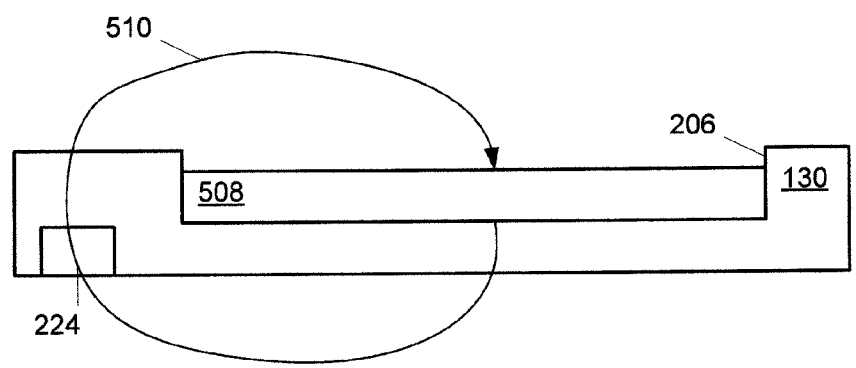
FIG. 6 is a schematic representation of a cross section of a prior art wireless mobile communication device powered by a prior art battery therein, and further depicting magnetic flux emitted from the battery.

FIG. 5 depicts a schematic representation of a cross-section of a battery 508, similar to battery 208, comprising a case 540 containing a battery portion 509, which in some embodiments is similar to the "jellyroll" described above with reference to FIG. 3b. FIG. 5 further depicts the magnetic flux 510 emitted from the battery 508 when it is in operation (for example when inserted into the battery interface 206 of communication device 130, as depicted in FIG. 6). It is understood that the battery portion 509 is the source of the magnetic flux 510. Indeed, FIG. 6 depicts the battery 508 inserted into the battery interface 206, with magnetic flux 510 passing through, and in the general area of, the receiver 224, such that when the receiver 224 is held adjacent to a hearing aid, the magnetic flux 510 will interfere with the operation of the hearing aid by decreasing the SNR of the hearing aid (e.g. noise will increase).

It is furthermore understood that depictions of magnetic flux in FIG. 5, as well as in FIGS. 6, 7a, 8, 10, 13, 14 and 15 are approximations. Modeling of magnetic flux from a battery is provided in FIGS. 11a and 11b, described below. Modeling of magnetic field from a battery with a magnetic shield in place is provided in FIGS. 12a and 12b, described below.

As described in detail below, magnetic noise may be significantly reduced (e.g. >10 dB reduction over the prior art) by providing a magnetic shield to direct the magnetic flux 510 away from the region of the receiver 224. In some embodiments, as depicted in a schematic cross-section in FIG. 7a, a battery 708 is provided which comprises a battery portion 710, similar to battery 508 with like elements having like numbers, though starting with "7" rather than "2" (e.g. case 740 is similar to case 540), and a magnetic shield portion 712. The magnetic shield portion 712 generally comprises a high magnetic permeability material, including but not limited to Mu Metal, however other materials of suitable magnetic permeability are within the scope of present embodiments. Furthermore, the magnetic shield portion 712 is arranged relative to battery portion 710 so that the magnetic flux 510' is generally routed through the magnetic shield portion 712 such that when the battery 708 is inserted into the battery interface 206 of the communication device 130, and the battery 708 is in operation, the magnetic flux 510' is generally routed away from the receiver 224. Hence, in general, at least some portion of magnetic shield portion 712 is oriented such that a normal 713 of the magnetic shield portion 712 is generally aligned in the direction of the receiver 224 when the battery 708 is inserted into the battery interface 206.

Figure 14:
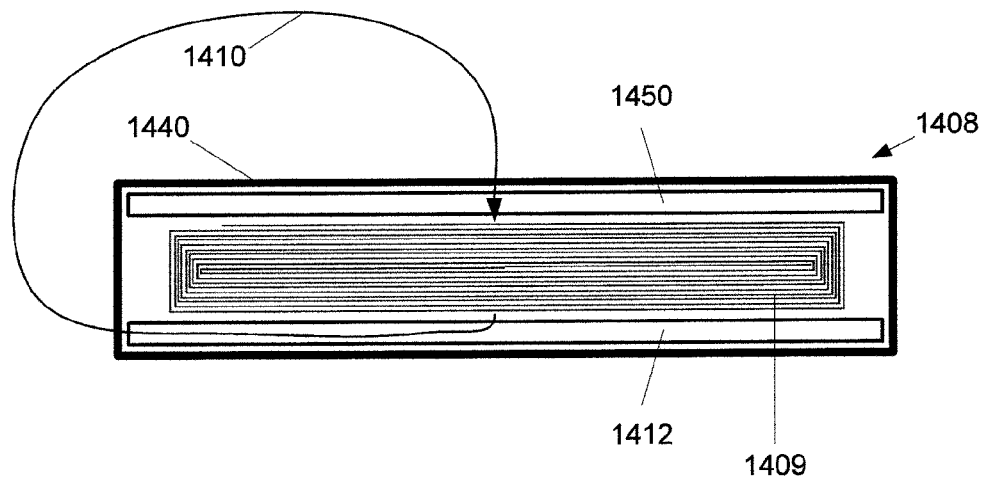
FIG. 14 is a schematic representation of a cross section of a battery incorporating a magnetic shield portion and a structural element, the magnetic shield portion also providing structural support.
Figure 15:
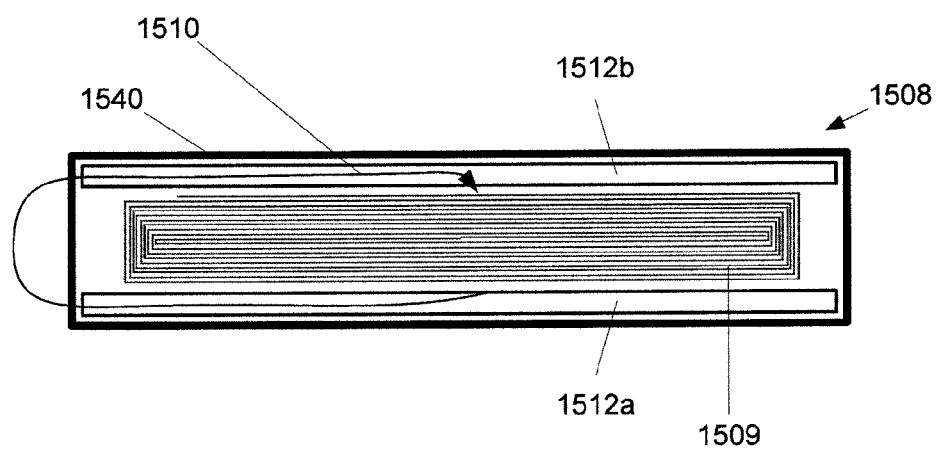
FIG. 15 is a schematic representation of a cross section of a battery incorporating two magnetic shield portions, each magnetic shield portion also providing structural support.

It is understood that while in FIG. 7 the magnetic shield portion 712 is external to outside to the case 740, in other embodiments the magnetic shield portion 712 can be internal to the case 740 (e.g. located between the battery portion 710 and the case 740), for example see FIGS. 14 and 15.

The thickness and geometry of the magnetic shield portion 712 can be dependent on the geometry of the magnetic flux 510', and the position of the receiver 224 relative to the battery 708 when inserted into the battery interface 206. Indeed, the thickness and geometry of the magnetic shield portion 712 can be optimized using the equations of magnetostatics:

$$\vec{\nabla} \cdot \vec{B} = 0 \text{ and } \vec{\nabla} \times \vec{H} = \frac{4\pi}{c} \vec{J} \text{ where } \vec{B} = \mu \vec{H} \quad \text{(Equation Set 1)}$$

whereby B is magnetic flux density, H is magnetic field intensity, c is the speed of light, J is current density and μ is magnetic permeability. Equation Set 1 is then generally solved with the boundary conditions:

$$\vec{B}_2 \cdot \vec{n} = \vec{B}_1 \cdot \vec{n} \text{ and } \vec{B}_2 \times \vec{n} = \frac{\mu_2}{\mu_1} \vec{B}_1 \times \vec{n} \quad \text{(Equation Set 2)}$$

whereby $B_1$ and $B_2$ are the magnetic flux density in, respectively, a first medium 1 and an adjacent second medium 2 (e.g. medium 1 comprises the medium outside the magnetic shield portion 712 and medium 2 comprises the material of the magnetic shield portion 712, such as Mu metal); n is the normal of the interface between medium 1 and medium 2; and $\mu_1$ and $\mu_2$ are the magnetic permeabilities of medium 1 and medium 2, respectively. These equations can be solved using any suitable software, including commercially available software.

Figure 7A:
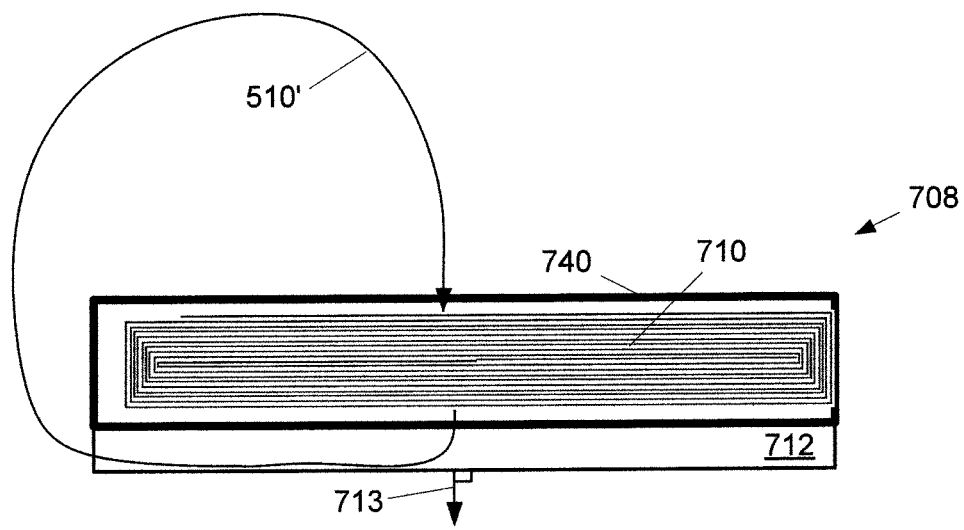
FIG. 7a is a schematic representation of a cross section of a battery incorporating a battery portion and a magnetic shield portion.
Figure 7B:
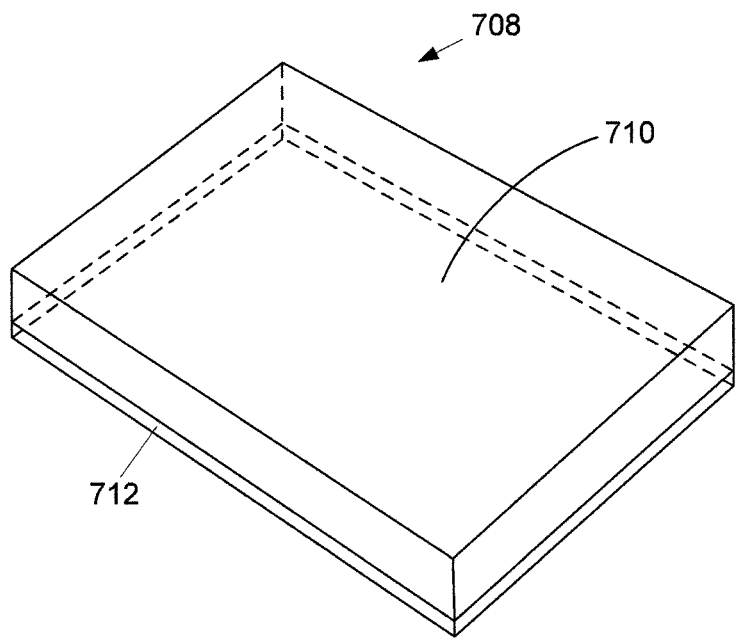
FIG. 7b is a schematic representation of a perspective view of a battery incorporating a battery portion and a magnetic shield portion.

FIG. 7b depicts a perspective view of block diagram battery 708, including the battery portion 710 and the magnetic shield portion 712. For clarity, the case 740 is not depicted in FIG. 7b, though it is understood that magnetic shield portion 712 can be either internal or external to the case 740. While in FIGS. 7a and 7b, the magnetic shield portion 712 is depicted as having the same general area of the battery portion 710, it is understood that the magnetic shield portion 712 can be smaller or larger than the area of the battery portion 710, as desired, as long as there is an overall reduction in magnetic flux in the area of the receiver 224 when the battery 708 is in operation in the communications device 130 (see FIG. 8 below). Furthermore, while in FIGS. 7a and 7b, magnetic shield portion 712 is depicted as being incorporated on a face of the battery portion 710 and/or the case 740, this is not to be considered particularly limiting; indeed, as described above, the magnetic shield portion 712 can be located internal or external to the case 740.

Figure 8:
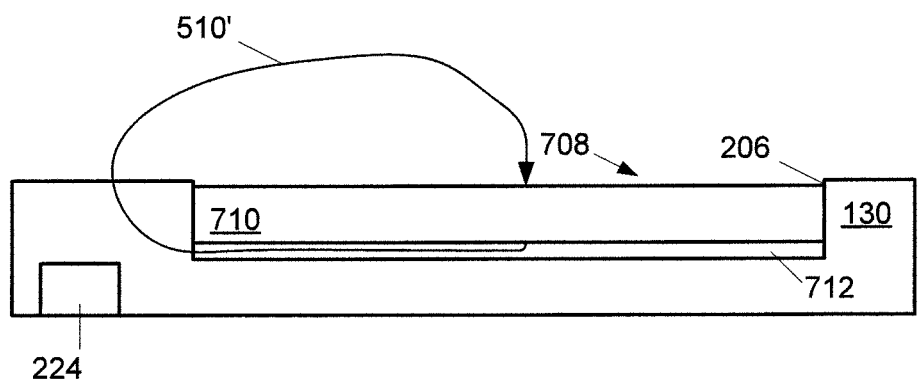
FIG. 8 is a schematic representation of a cross section of a wireless mobile communication devices powered by the battery of FIGS. 7a and b, and further depicting magnetic flux emitted from the battery.

Turning now to FIG. 8, when battery 708 is inserted in battery interface 206 of communication device 130, the magnetic flux 510' is directed away from the general area of the receiver 224, hence reducing interference with a hearing aid adjacent to receiver. Hence, it is understood that magnetic shield portion 712 is arranged on a side of the battery portion 710 which, when inserted into communication device 130, is generally facing the receiver.

Figure 9A:
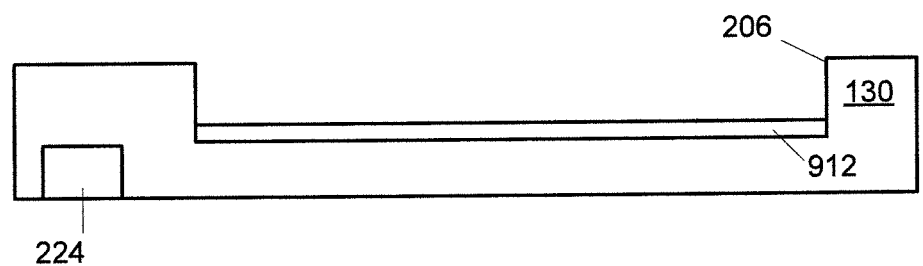
FIG. 9a is a schematic representation of a cross section of a wireless mobile communication device incorporating a magnetic shield portion.

In alternative non-limiting embodiments, as depicted in FIG. 9a, a magnetic shield portion 912, similar to magnetic shield portion 712, is incorporated into communication device 130. The magnetic shield portion 912 is generally located between the battery interface 206 and the receiver such that at least one normal of the magnetic shield portion 912 is pointing in a direction of a magnetic field emitted from a battery (not depicted) inserted into battery interface 206 when the battery is in operation in the communication device 130. Hence, magnetic flux will be conducted away from the receiver 224 when the battery is in operation, as in FIG. 7.

While in FIG. 9a the magnetic shield portion 912 is depicted as having the same general area of battery interface 206, it is understood that the area of the magnetic shield portion 912 can be smaller or larger than the area of the battery interface 206, as desired, as long as there is an overall reduction in magnetic flux in the area of the receiver 224. Furthermore, while in FIG. 9a, magnetic shield portion 912 is depicted as being incorporated into battery interface 206, this is not to be considered particularly limiting; indeed, the magnetic shield portion 912 can be located in any suitable part of communication device 130, between the battery interface 206 and receiver. For example, as depicted in FIG. 9b, a magnetic shield portion 912' can be incorporated into the body of the communication device 130.

Figure 9B:
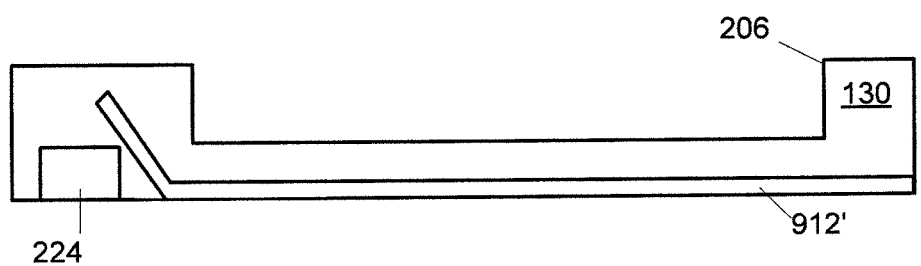
FIG. 9b is a schematic representation of a cross section of a wireless mobile communication device incorporating a magnetic shield portion.

It is further understood that embodiments such as that depicted in FIG. 9b shield the area of the receiver 224 not only from magnetic flux emitted from a battery inserted into the battery interface 206, but from other sources of magnetic interference within the communication device 130.

Figure 10:
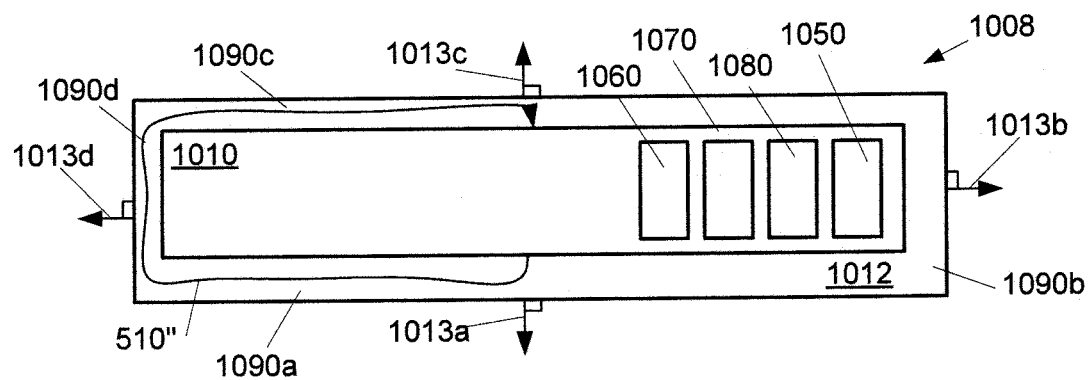
FIG. 10 is a schematic representation of a side view of a battery incorporating a battery portion and a magnetic shield portion, the magnetic shield portion encompassing the battery portion.

Attention is now directed to FIG. 10, which depicts alternative non-limiting embodiments of a battery 1008, similar to battery 708, with like elements having like numbers, however starting with "10" rather than "7". However, in these embodiments, the magnetic shield portion 1012 comprises a plurality of interconnected planes 1090a, 1090b, 1090c, 1090d, each having a respective normal 1013a, 1013b, 1013c, 1013d, such that the battery portion 1010 is generally encompassed by the magnetic shield portion 1012. While only four of the interconnected planes are depicted in FIG. 10, it is understood that each side of the battery portion 1010 is associated with a respective plane of the magnetic shield portion 1012. In other words, if the battery portion 1010 is generally a rectangular box, then the magnetic shield portion 1012 is also a generally rectangular box of proportions similar to the battery portion 1010, however with apertures there through for electrodes 1050, 1060, 1070 and 1080. Hence, magnetic flux 510" emitted from the battery portion 1010 when in operation, is now largely contained within the magnetic shield portion 1012.

Figure 11A:
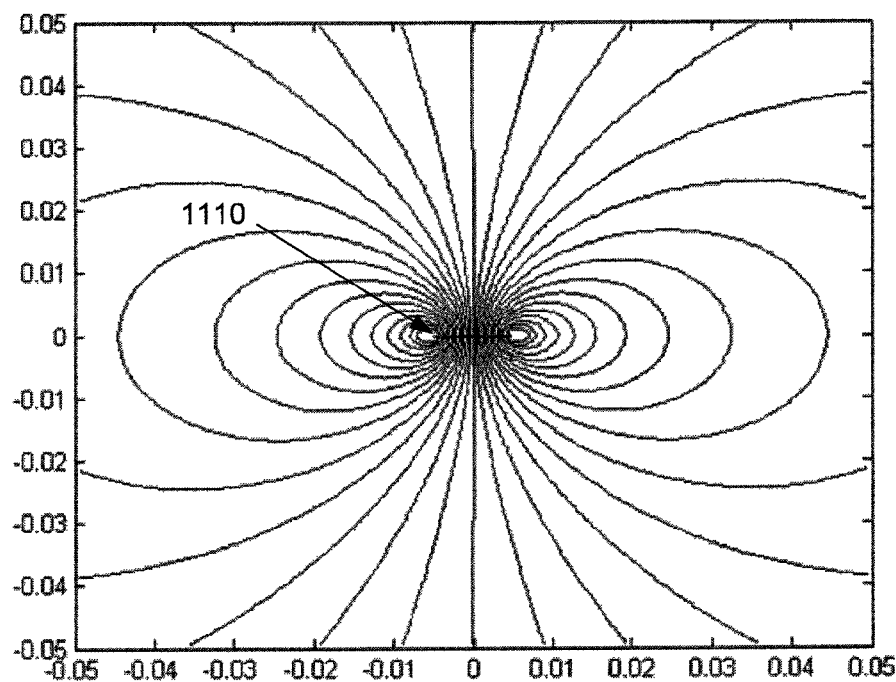
FIGS. 11a and 11b are schematic representations of a model of a current loop representative of a battery in a mobile communication device.
Figure 11B:
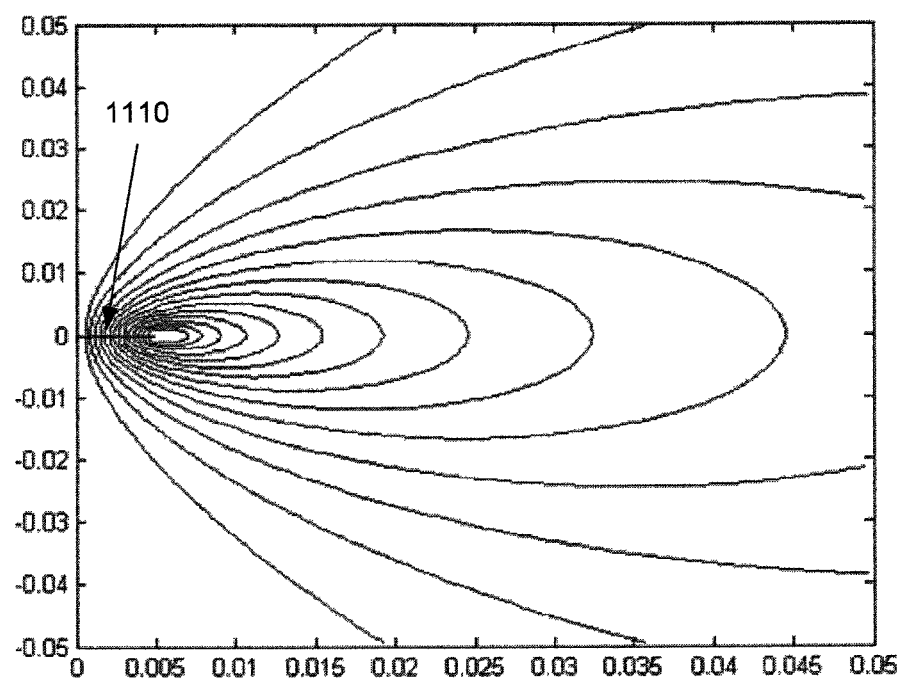

Attention is now directed to FIGS. 11a and 11b, which depict magnetic field lines of a model of a current loop 1110 of radius 0.05, according to non-limiting embodiments. FIG. 11b is similar to FIG. 11a, but depicts only the right hand side of FIG. 11a. It is understood that each of FIGS. 11a and 11b have been modeled with arbitrary units. It is furthermore understood that the current loop depicted in FIGS. 11a and 11b can be used to model the battery 508.

Figure 12A:
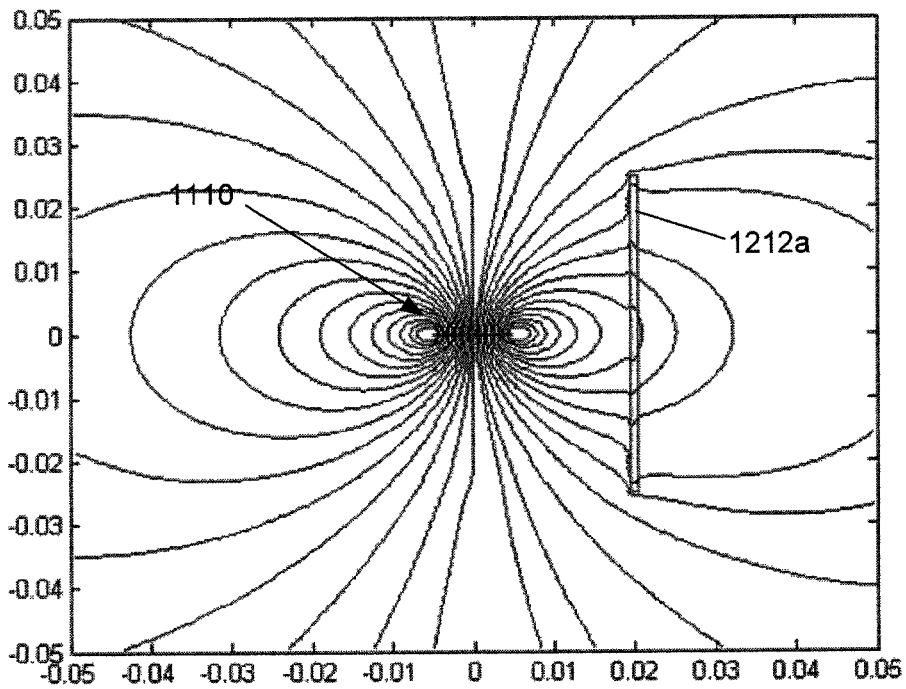
FIGS. 12a and 12b are schematic representations of a model of a current loop representative of a battery in a mobile communication device with a magnetic shield in place.
Figure 12B:
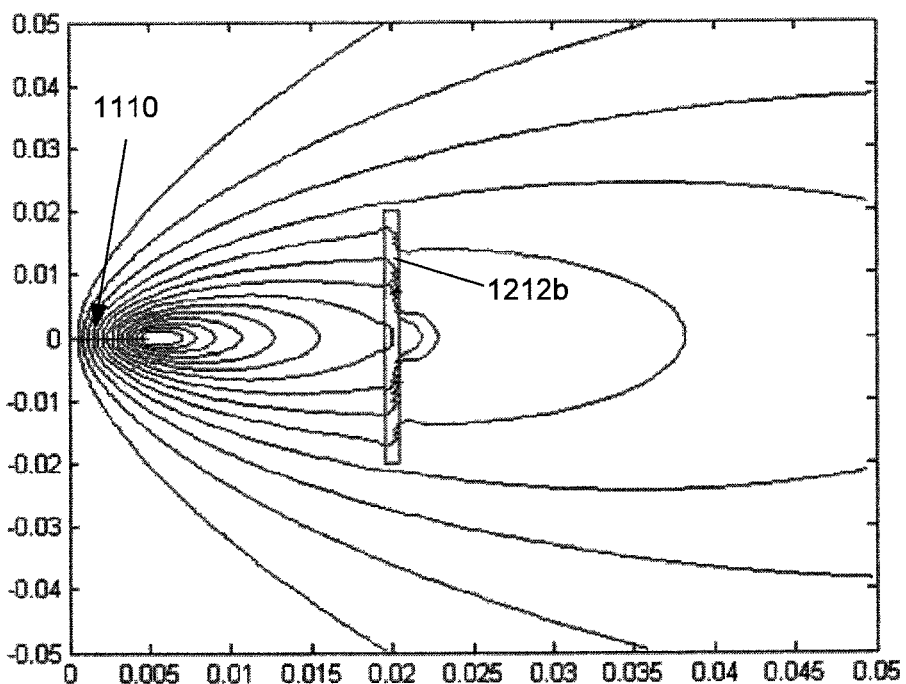

Attention is now directed to FIGS. 12a and 12b, which are similar to FIGS. 11a and 11b, respectively, however each of the models depicted in FIGS. 12a and 12b include a magnetic shield portion 1212a and 1212b, respectively, each similar to magnetic shield portions 712, 912, 1012 described above. Furthermore, the magnetic permeability of the magnetic shield portion 1212b being greater than the magnetic permeability of the magnetic shield portion 1212a. In any event, from a comparison of FIGS. 11a and 11b, it is understood that there is a reduction in magnetic flux to the right of the magnetic shield portion 1212a. FIGS. 11a and 12a are understood to represent a communication device, with the current loop 1110 representative of a battery in the communication device, and the magnetic shield portion 1212a representative of a magnetic shield portion in the communication device. FIG. 11a represents the communication device without a magnetic shield portion and FIG. 12a represents the communication device with a magnetic shield portion. Hence, from a comparison of FIGS. 11a and 12a, it is understood that a receiver of the communication device located to the right of the magnetic shield portion 1212a would experience a reduction in magnetic flux with the magnetic shield portion when compared to a communication device without the magnetic shield portion 1212a. Similarly, it is understood that a similar reduction in magnetic flux is present between FIGS. 11b and 12b; furthermore, from a comparison of FIGS. 12a and 12b, it is understood that by increasing magnetic permeability of a magnetic shield portion, the magnetic flux can be further reduced (i.e. the magnetic flux to the right of the magnetic shield portion 1212b is less than the magnetic flux to the right of the magnetic shield portion 1212a).

Figure 13:
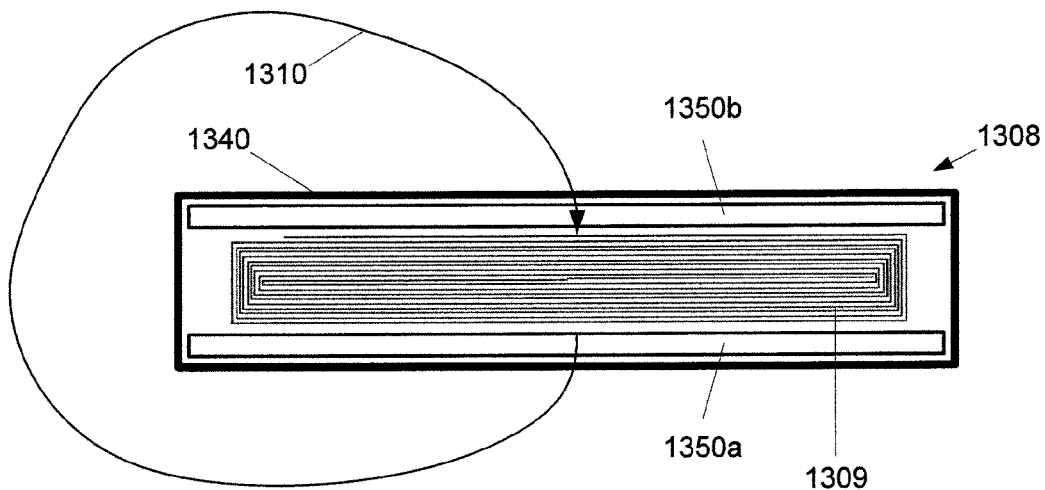
FIG. 13 is a schematic representation of a cross section of a prior art battery incorporating structural elements.

Attention is now directed to FIG. 13, which depicts a battery 1308, similar to the battery 508 depicted in FIG. 5, with like elements having like numbers, however preceded by a "13" rather than a "5". For example, the battery 1308 comprises a case 1340 similar to the case 540. However, the battery 1308 further comprises structural elements 1350a and 1350b. For example, in some embodiments, the case 1340 can be comprised primarily of plastic. Hence to give the battery 1308 structural stability, for example to meet ruggedness testing, the structural elements 1350a, 1350b can comprise plates made from any suitable metal, such as stainless steel and aluminum, and are of a suitable thickness to provide structural stability to the battery 1308. In general, each structural element 1350a and 1350b can be the same or different thicknesses, as desired. It is understood that the structural elements 1350a, 1350b generally sandwich the battery portion 1309 inside the case 1340. FIG. 13 further depicts magnetic flux 1310, similar to the magnetic flux 510, emitted from the battery portion 1409, when the battery 1408 is in operation. Similar to the description of the battery 508 described above, the magnetic flux 1310 from the battery 1308 can interfere with operation of a hearing aid, by decreasing the SNR of the hearing aid (e.g. noise will increase), when the battery 1408 is in operation in the mobile communication device 130, and the receiver 224 is held adjacent to the hearing aid.

Attention is now directed to FIG. 14, which depicts a battery 1408, similar to the battery 1308, with like elements having like numbers, however preceded by a "14" rather than a "13". For example, the battery 1408 comprises a case 1440 similar to the case 1340. However the battery 1408 includes a first structural element 1450, similar to the structural element 1350a, and a magnetic shield portion 1412. Magnetic shield portion 1412 is similar to structural element 1350b, however magnetic shield portion 1412 generally comprises a high magnetic permeability material, similar to the magnetic shield portion 712. The high magnetic permeability material can include, but is not limited to, Mu Metal, and it is understood that other materials of suitable magnetic permeability are within the scope of present embodiments. Furthermore, the magnetic shield portion 1412 is on a side of the battery portion 1409 such that the magnetic flux 1410 is generally routed through the magnetic shield portion 1412 such that when the battery 1408 is inserted into the battery interface 206 of the communication device 130. In other words, when the battery 1408 is in operation, the magnetic flux 1410 is generally routed away from the receiver 224, similar to the battery 708.

Furthermore, the magnetic shield portion 1412 provides structural stability to the battery 1408, similar to the structural element 1350b, and hence the magnetic shield portion 1412 can comprise a plate made from any suitable high magnetic permeability metal, such as Mu Metal, and is of a suitable thickness to provide structural stability to the battery 1408. It is hence understood that the structural element 1450 and the magnetic shield portion 1412, generally sandwich the battery portion 1409 inside the case 1440. Hence, in general, structural element 1450 and the magnetic shield portion 1412 provide similar structural functionality to the battery 1408 as the structural element 1350a and 1350b in the battery 1308, however the magnetic shield portion 1412 further routes the magnetic flux away from the receiver 224 when the battery 1408 is in operation in the mobile communication device 130. In general, it is further understood that each of the magnetic shield portion 1412 and structural element 1450 can be the same or different thicknesses, as desired.

Attention is now directed to FIG. 15, which depicts a battery 1508, similar to the battery 1408, with like elements having like numbers, however preceded by a "14" rather than a "15". For example, the battery 1508 comprises a case 1540 similar to the case 1440. However the battery 1508 includes a first magnetic shield portion 1512a, similar to the magnetic shield portion 1412, and a second magnetic shield portion 1512b, similar to magnetic shield portion 1412. Magnetic shield portions 1512a and 1512b are similar to structural elements 1450a and 1450b, respectively, each of magnetic shield portions 1512a and 1512b generally comprises a high magnetic permeability material, similar to the magnetic shield portion 712. The high magnetic permeability material can include, but is not limited to, Mu Metal, and it is understood that other materials of suitable magnetic permeability are within the scope of present embodiments. Furthermore, the magnetic shield portions 1512a is on a side of the battery portion 1509 such that the magnetic flux 1510 is generally routed through the magnetic shield portion 1512a such that when the battery 1508 is inserted into the battery interface 206 of the communication device 130. In other words, when the battery 1508 is in operation, the magnetic flux 1510 is generally routed away from the receiver 224, similar to the battery 708. However, as the magnetic shield portion 1512b also comprises a high magnetic permeability material, the magnetic flux 1510 is also routed through the magnetic shield portion 1512b. In general, as magnetic shield portions 1512a and 1512b sandwich the battery portion 1509, a significant portion of the magnetic flux 1510 is generally contained within the battery 1508.

Furthermore, each of the magnetic shield portions 1512a and 1512b provides structural stability to the battery 1508, similar to the structural elements 1350a and 1350b, and hence each of the magnetic shield portions 1512a and 1512b can comprise a plate made from any suitable high magnetic permeability metal, such as Mu Metal, and are each of a suitable thickness to provide structural stability to the battery 1508. In general, it is further understood that each of the magnetic shield portions 1512a and 1512b can be the same or different thicknesses, as desired. As it is further understood that the magnetic shield portions 1512a and 1512b generally sandwich the battery portion 1509 inside the case 1540, the magnetic shield portions 1512a and 1512b provide similar structural functionality to the battery 1508 as the structural element 1350a and 1350b in the battery 1308, however the magnetic shield portions 1512a and 1512b further route the magnetic flux away from the receiver 224 when the battery 1508 is in operation in the mobile communication device 130.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A battery comprising:
   a case;
   a battery portion enabled to provide electrical power to a device; and
   a planar magnetic shield portion internal to the case, the planar magnetic shield portion enabled to provide structural support to the battery and route magnetic flux from the battery portion away from a receiver of the device when the battery is inserted therein.

2. The battery of claim 1, wherein the planar magnetic shield portion is substantially parallel to a side of the battery portion.

3. The battery of claim 1, wherein the planar magnetic portion is on a side of the battery portion enabled to be oriented towards the receiver of the device when the battery is inserted therein.

4. The battery of claim 1, wherein the planar magnetic shield portion is enabled to be located substantially between the battery portion and the receiver of the device when the battery is inserted therein.

5. The battery of claim 1, wherein the planar magnetic shield portion comprises a box substantially encompassing the battery portion.

6. The battery of claim 5, wherein the box comprises apertures for contacting the battery portion.

7. The battery of claim 1, further comprising a planar structural element, internal to the case that provides further structural support to the battery.

8. The battery of claim 7, wherein the planar magnetic shield portion and the planar structural element substantially sandwich the battery portion.

9. The battery of claim 7, wherein the planar structural element is enabled to route the magnetic flux there through, such that the magnetic flux is routed through the planar magnetic shield portion and the planar structural element.

10. The battery of claim 1, wherein at least one normal of the planar magnetic shield portion is oriented in a direction of the magnetic flux.

\* \* \* \* \*